US012789677B2

(12) United States Patent
Müller et al.

(10) Patent No.: US 12,789,677 B2
(45) Date of Patent: Nov. 10, 2026

(54) CHILD SEAT COMPRISING AN IMPACT SHIELD TO BE MOUNTED ON A MOTOR VEHICLE SEAT

(71) Applicant: CYBEX GmbH, Bayreuth (DE)

(72) Inventors: Thomas Müller, Bayreuth (DE); Iain Powell, Bayreuth (DE); Christoph Thurn, Bayreuth (DE)

(73) Assignee: CYBEX GmbH, Bayreuth (DE)

( * ) Notice: Subject to any disclaimer, the term of this patent is extended or adjusted under 35 U.S.C. 154(b) by 172 days.

(21) Appl. No.: 18/568,211

(22) PCT Filed: Jun. 7, 2022

(86) PCT No.: PCT/EP2022/065375
§ 371 (c)(1),
(2) Date: Dec. 7, 2023

(87) PCT Pub. No.: WO2022/258602
PCT Pub. Date: Dec. 15, 2022

(65) Prior Publication Data

US 2024/0270131 A1 Aug. 15, 2024

(30) Foreign Application Priority Data

Jun. 8, 2021 (DE) ..................... 20 2021 103 087.9

(51) Int. Cl.
*B60N 2/28* (2006.01)
*B60R 21/207* (2006.01)

(52) U.S. Cl.
CPC ......... *B60N 2/2839* (2013.01); *B60N 2/2824* (2013.01); *B60N 2/286* (2013.01); *B60N 2/2884* (2013.01); *B60R 21/2072* (2013.01)

(58) Field of Classification Search
CPC .. B60N 2/2839; B60N 2/2884; B60N 2/2824; B60N 2/286; B60R 21/2072
(Continued)

(56) References Cited

U.S. PATENT DOCUMENTS 4,834,420 A * 5/1989 Sankrithi ................ B60R 22/10 297/250.1
6,736,455 B1 * 5/2004 Zakovic .............. B60R 21/2072 297/488

FOREIGN PATENT DOCUMENTS

CN 108177562 A * 6/2018 ............... B60N 2/26
DE 911261401 1/1992
(Continued)

OTHER PUBLICATIONS

"International Application No. PCT/EP2022/065375, International Search Report and Written Opinion mailed Jul. 29, 2022", (Jul. 29, 2022), 21 pgs.
(Continued)

*Primary Examiner* — Milton Nelson, Jr.
(74) *Attorney, Agent, or Firm* — Schwegman Lundberg & Woessner, P.A.

(57) ABSTRACT

Child seat for mounting on a motor vehicle seat, wherein the child seat has a main body for accommodating a child and an impact shield for holding the child, wherein at least one active protective component is arranged on or formed by the impact shield, the active protective component is transferable from a non-activated state to an activated state. When the active protective component is in the non-activated state, a rotation of a body of the child relative to a buttocks of the child is enabled or a displacement of the child in the direction of travel is enabled and when the active protection component is in the activated state rotation is not enabled or only enabled to a limited extent or the displacement of the child in the direction of travel is not enabled or only enabled to a limited extent.

13 Claims, 3 Drawing Sheets

Figure 1:
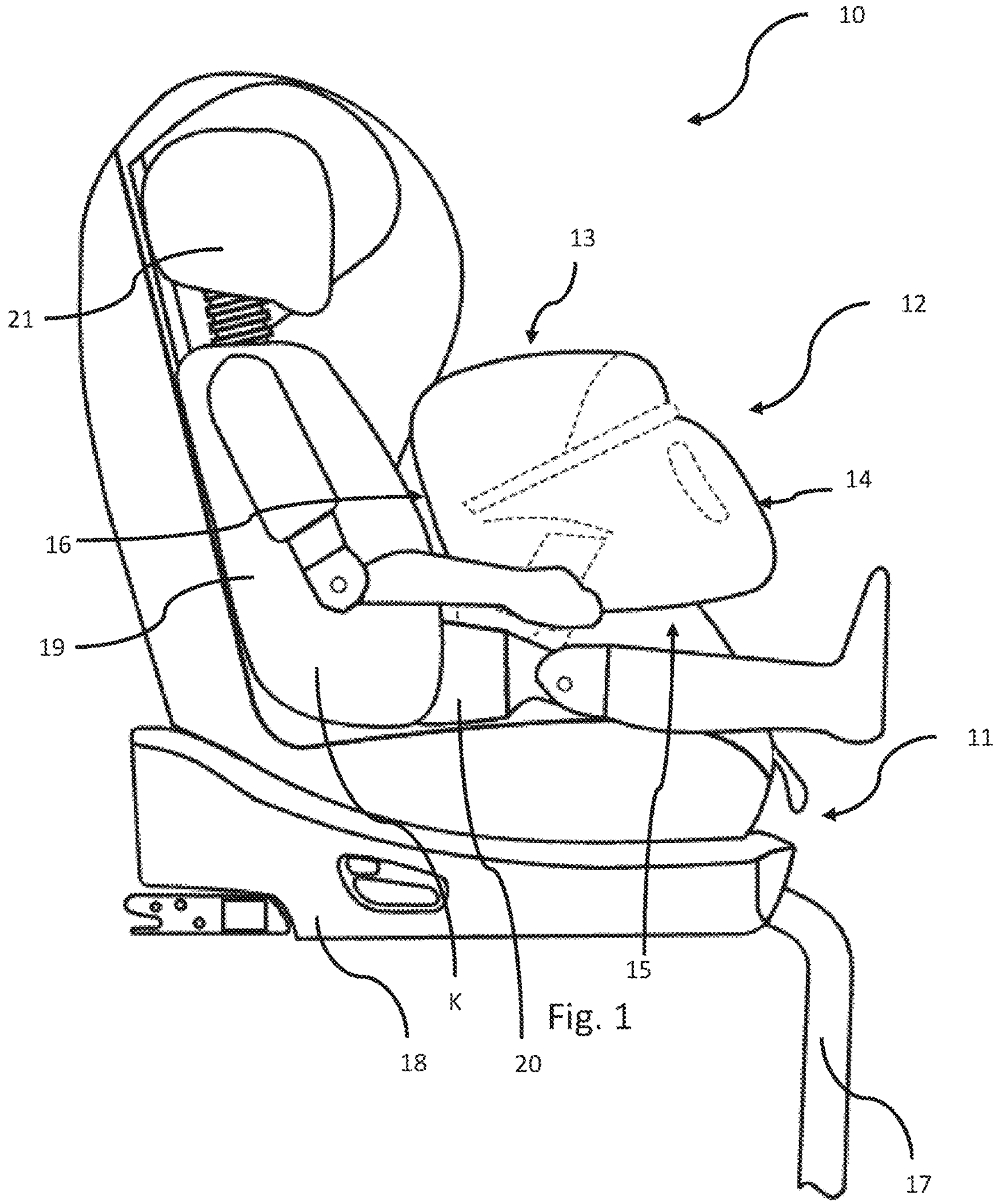

(58) Field of Classification Search
USPC .................................................... 297/216.11
See application file for complete search history.

(56) References Cited

FOREIGN PATENT DOCUMENTS

| | | | | | |
|---|---|---|---|---|---|
| DE | 9112614 | U1 * | 2/1992 | | |
| DE | 9208309 | U1 | 10/1993 | | |
| DE | 9409377 | U1 | 8/1994 | | |
| DE | 4341218 | A1 | 6/1995 | | |
| DE | 4418028 | A1 | 11/1995 | | |
| DE | 19932801 | A1 | 1/2001 | | |
| DE | 202017105118 | U1 * | 11/2018 | ........... | B60N 2/2887 |
| DE | 102017126235 | A1 | 5/2019 | | |
| EP | 3626518 | A1 | 3/2020 | | |
| GB | 2266839 | A | 11/1993 | | |
| JP | 2004314802 | | 11/2004 | | |
| JP | 2020531357 | | 11/2020 | | |
| KR | 20210005698 | | 1/2021 | | |
| WO | WO-2022258602 | A1 | 12/2022 | | |

OTHER PUBLICATIONS

"Japanese Application No. 2023-575524, Office Action dated Mar. 23, 2026", w English Translation, Mar. 23, 2026, 9 pgs.

* cited by examiner

CHILD SEAT COMPRISING AN IMPACT SHIELD TO BE MOUNTED ON A MOTOR VEHICLE SEAT

PRIORITY CLAIM TO RELATED APPLICATIONS

This application is a U.S. national stage filing under 35 U.S.C. § 371 from International Application No. PCT/EP2022/065375, filed on 7 Jun. 2022, and published as WO2022/258602 on 15 Dec. 2022, which claims the benefit under 35 U.S.C. 119 to German Application No. 20 2021 103 087.9, filed on 8 Jun. 2021, the benefit of priority of each of which is claimed herein, and which applications and publication are hereby incorporated herein by reference in their entirety.

The invention relates to a child seat for mounting on a motor vehicle seat according to claim 1.

Child seats for mounting on a motor vehicle seat are generally known in the prior art. Such child seats can have an impact shield.

Some of the features of such a child seat are described below; these can also be realised (partially or completely) in embodiments according to the invention.

The main body of such a child seat generally has at least one seat section, optionally also a back section (possibly including a headrest).

Furthermore, a base, a support foot and/or other elements may be provided. The seat section and—if present—the back section and/or the headrest can comprise side parts which can give the main body a shell-like character (seat shell). The main body of a child seat can also have, for example, at least one side impact protection, at least one belt guide and/or at least one anchoring element (e.g. Isofix anchoring element or LATCH anchoring element) and/or other elements.

It should further be noted that, in the context of the present invention, the term "child seat" is to be understood as a generic term for "classic" child seats and infant carriers. In this respect (unless otherwise stated in the specific context) child seat is always to be understood as an abbreviated form of writing for "child seat or infant carrier" or, in the context of the present invention, features provided for a child seat are in principle also applicable to an infant carrier and vice versa (as long as nothing to the contrary is mentioned). The same applies to the term "child", which is also to be understood as a generic term for children, babies as well as infants. So-called "infant carriers" often (only) comprise a one-piece shell for holding the baby or child and may include a belt system of their own, possibly a headrest and possibly other components. Instead of a (structurally delimited) backrest, such "infant carriers" have a back section that connects to a "seat area" in which the child's buttocks can be accommodated. Child seats for older children, on the other hand, have a backrest that is structurally separated from a seat area, the inclination of which can be varied relative to the seat area if necessary. The structural separation can, for example, be formed by a kink or similar.

Furthermore, solutions are known in the state of the art in which an impact shield is equipped with an active protective means (in particular an airbag). In this regard, reference can be made to DE 20 2017 105 118 U1, for example.

However, the solutions known from the prior art are still considered to be in need of improvement in terms of safety.

In particular, it is the object of the invention to propose a child seat for mounting on a motor vehicle, in which the child is held in a safe and simple manner during strong accelerations (or decelerations, in particular in the event of a collision) by an impact shield such that the risk of serious injuries is reduced.

This object is solved in particular by a child seat according to claim 1.

In particular, the object is solved by a child seat for mounting on a motor vehicle seat, wherein the child seat has a main body for accommodating a child and an impact shield for holding the child, wherein at least one active protective means is arranged on or formed by the impact shield, wherein the active protective means is transferable from a non-activated state to an activated state.

According to a preferred first aspect of the invention, the child seat is configured such that in the non-activated state a rotation of the upper body of the child relative to the buttocks of the child is enabled and in the activated state is not enabled or only enabled to a limited extent. Alternatively or additionally (according to a second aspect of the invention), in the non-activated state a displacement of the child in the direction of travel is enabled and in the activated state is not enabled or only enabled to a limited extent. Further alternatively or additionally (according to a third aspect), in the non-activated state a rotation of the head of the child relative to the upper body of the child is enabled and in the activated state is not enabled or only enabled to a limited extent.

One idea associated with the first to third aspects is to configure the child seat or its active protective means such that a rotation of the child is counteracted as far as possible (or is largely prevented) and not just to catch the child in a cushion-like or curtain-like manner. In particular, a main task of the active protective means is therefore seen (or the child seat configured that way) as preventing or at least reducing a rotation of the child (or of a body part of the child, in particular of a head relative to the torso). In this way, an improved protective effect can be achieved with simple measures.

According to a further preferred (fourth) aspect of the invention, which can preferably be combined with the first and/or second and/or third aspect above, the above object is solved in particular by a child seat, wherein the child seat has a main body for accommodating a child and an impact shield for holding the child, wherein the impact shield has at least one active protective means on its upper side, wherein the active protective means is transferable from a non-activated state to an activated state, wherein the active protective means in the activated state extends only partially over the upper side of the impact shield, preferably does not extend over a front section of the upper side of the impact shield.

According to the fourth aspect, it is particularly important that a rotation of the child can be counteracted in a manner as simply as possible. The focus is therefore not on an active protective means (in particular an airbag) that extends over as large an area as possible, but rather on a comparatively (also or at least in the active state) compact protective device (airbag) that purposefully prevents or reduces a rotation of the child (and/or of body parts of the child, for example of the head relative to the torso).

In particular, by such a solution it is achieved that the active protective means (in particular the airbag) is transferable comparatively quickly into its activated state and can effectively (locally) develop its effect where forces resulting from the rotation of the child (or body parts of the child) act notably. As a result, also by the fourth aspect an improvement in the safety is achieved in a comparatively simple manner. In particular, faster inflation (due to the smaller volume of an airbag) can be achieved with such a localised design.

The active protection means preferably comprises an inflatable gas bag, in particular an airbag (or is formed from such an airbag).

The seat section of the main body can have a seat surface for accommodating the buttocks, possibly also legs or leg sections of a child (or dummies, in particular dummies of the Q or P series) accommodated in the child seat, as well as right and left side areas, which can also be designed as side parts. If necessary, the side parts can also be designed in such a way that an accommodating opening (which can have the shape of a small horn) results between an upper section (connected to the seat section like an armrest with a rear area) and a lower section (continuing the seat surface essentially to the side). The main body, in particular the seat section, can have at least one first fastening means (e.g., a right and a left fastening element) for fastening an impact shield.

The impact shield is rigid, at least in sections, and is designed to restrain a child in a child seat. For this purpose, the impact shield generally has a centre section (relative to a lateral extension), which is designed to restrain a child, in particular a pelvic, abdominal and/or chest area of the child, as well as a right and a left lateral section, which is designed in particular to support lateral areas of the seat section (possibly on the side parts). Alternatively or additionally, the lateral sections can be provided as connecting parts, which are provided for (e.g. form-fit) engagement in a (respective) receptacle provided for this purpose (possibly the above accommodating opening of the seat section) (see, for example, GB 2 266 839 A).

If necessary, the impact shield can have at least one second fastening element for co-operating with the first fastening element of the main body in order to enable a fastening of the impact shield on the main body.

Advantageously, the impact shield is at least in sections energy-absorbing and/or made of a deformable, in particular plastically deformable material (for example EPP or EPS or EPO) (see EP 3 626 518 A1). Additionally or preferably alternatively to the second fastening element, the impact shield can have a belt guide for a vehicle belt (in particular for fastening the impact shield to the main body and/or for fastening the impact shield and main body together to the vehicle seat).

In general, the impact shield or its centre section may have an inner side (facing the pelvis/abdomen or chest of the child in proper use) and an underside (facing the legs or a leg section of the child in proper use). The impact shield can also have an outer side (at least essentially) opposite the inner side as well as an upper side (at least essentially) opposite the underside, so that at least in sections, particularly in the centre area, there can be a square, possibly rectangular, parallelogram- or trapezoid-shaped, possibly also oval or round cross-section, for example.

The child seat is preferably (in particular exclusively) designed for forward-facing installation (that is an arrangement on the motor vehicle seat in which the child looks in the forward direction of travel in straight-ahead forward direction of travel when the child itself is looking straight ahead).

An extension of the active protective means (airbags) in the respective (in particular active) state is to be understood in particular as the area that is occupied (or covered) by the active protective means (the airbag). Preferably, this should be a projection or projection area of the active protective means onto the upper side of the impact shield. Alternatively or additionally, respective projections of the active protective means as well as of the upper side of the impact shield (and/or the entire impact shield) onto a horizontal plane (in at least one state of use of the impact shield, possibly in several or all possible states of use) can also be used for comparison. In this sense, the active protective means (or airbag) should preferably only extend over at most 90%, further preferably at most 80%, possibly at most 70% or at most 60% of the upper side of the impact shield. Particularly preferably, a front section of the upper side of the impact shield remains free (or the active protective means does not extend over the front section of the upper side of the impact shield in the activated state). In particular, the foremost 10%, preferably the foremost 20%, possibly the foremost 30% of the upper side of the impact shield should not be covered by the active protective means in the activated state of the active protective means. The foremost x % should preferably be understood to mean length percentages (whereby the length should again preferably be the maximum extension of the upper side from front to back). If a projection of the upper side of the impact shield or of the (entire) impact shield is considered, also here the foremost x % are preferably length percentages (relative to the respective projection area, e.g., onto the horizontal). In general, for example, at least 10%, preferably at least 20%, even more preferably at least 30% or 40% of an upper side of the impact shield (and/or a horizontal projection of the upper side or of the entire impact shield) may not be covered or occupied by the active protective means (in the activated state).

The upper side of the impact shield can be structurally delimited from an inner side and/or an outer side by (possibly rounded) corners or edges. In the case of roundings, the centre of the respective rounding should preferably be used as the boundary. The upper side can also be defined in that the side or surface is meant that is recognisable in a top view from (exactly) above in a vertical downward direction (if necessary without taking the active protective means into account), that is relative to at least one state of use (if necessary several or all states of use).

In addition to the features already described at the beginning, the impact shield can also be characterised by further features. Preferably, an impact shield is to be understood as a device which is fastenably fastened (preferably in a detachable manner, in particular removably, at least in sections) to the main body of the child seat in order to hold the child on the main body. The impact shield is preferably (at least partially) dimensionally stable (in particular in the sense that it does not collapse under its own weight and/or under only slight external forces).

The impact shield can be made of plastic (at least in part, for example at least 80 wt. %) and/or comprise a padding (for example foamed material padding). The impact shield can be formed from at least 30% by weight, preferably at least 60% by weight of a solid and/or non-porous material (plastic). The impact shield can be formed from at least 30% by volume, preferably at least 60% by volume of a porous material (in particular foamed plastic, e.g. EPS or EPP). The impact shield can weigh at least 200 g or at least 500 g and/or at most 5 kg or at most 2 kg.

The impact shield can have at least one guiding device for guiding a vehicle belt (and/or other belt, for example a belt mounted or mountable on the main body) in such a way that the impact shield (in particular both the main body and the impact shield) can be fastened to the vehicle seat or the impact shield can be fastened to the main body.

The child seat is preferably configured for a forward-facing arrangement on the vehicle seat (so that the child looks in the direction of travel). By a direction of travel (forward direction) is meant, in particular, a movement of the vehicle in a straight-ahead direction, since a child seated in the child seat (when it looks straight ahead) is looking in the direction of travel. If the vehicle travelling forwards (straight ahead) is subjected to a (sudden) deceleration, for example due to a head-on accident, the child and child seat are subjected to inertial forces that act in the direction of travel.

A (normal) situation of use is to be understood in particular as a situation in which the impact shield is arranged (mounted) on the main body (in particular in accordance with the instructions of the child seat manufacturer) and in which a child (or dummy) can be safely supported by the child seat and held by the child seat or its impact shield (in particular in accordance with the specification of the child seat manufacturer).

A sudden deceleration (or an event with a sudden deceleration) is to be understood in particular as an event in which high accelerations (or decelerations) occur compared to a normal journey in a vehicle (e.g., car). In particular, a collision (head-on collision) or other accident should be understood as an event with sudden deceleration. Such a deceleration can be understood as a sudden deceleration in particular if the accelerations (or decelerations) are so great that an active protective device, such as an airbag, in the motor vehicle is triggered. Decelerations during a sudden deceleration event can possibly exceed 2 g, possibly even 3 g or even 5 g or even 8 g (or, if these limits are exceeded, be understood as a corresponding sudden deceleration event). In particular, a collision (“crash”), as described as a “frontal crash” in UN ECE-R44 or in UN ECE-R129 (valid at the time of application or priority, to be retrieved e.g. on the UNECE website www.unece.org), should be understood as a sudden deceleration event.

In particular, the present seat or its impact shield should be approved for children of a minimum height up to a maximum height, wherein the minimum height can be at least 60 cm, preferably at least 75 cm and/or the maximum height can be at most 130 cm, preferably at most 116 cm.

Alternatively or additionally, the seat can be designed at least for dummy (or children which are simulated by the corresponding dummies) from Q1 or Q1.5 to Q6.

The aforementioned standard UN ECE-R129 can specifically be “Regulation No. 129—Uniform provisions concerning the approval of enhanced child restraint systems used on board of motor vehicles (ECRS)” or E/ECE 324/Rev.2/Add.128-E/ECE/Trans.505/Rev.2/Add.128, for example valid as of 9 Jul. 2013 and/or 31 Dec. 2013 and/or as of the time of priority or application).

Specifically, as dummies those of the manufacturer Humanetics can be used. Additional information can be found in the manuals of the manufacturer Humanetics (to which also the standard UN ECE-R129 refers).

If, in the present context, it is a matter of a position of use or a state of use of the impact shield (in particular with regard to any defined angles and/or projections), the respective specification should be fulfilled in particular for at least one possible state of use if several states of use can be set (for example if the impact shield and/or a part of the child seat on which the impact shield is mounted can be changed with regard to its angular position), preferably for at least half the total adjustable angular range (with regard to the orientation of the impact shield relative to the horizontal).

The starting point is preferably the impact shield or child seat in a state in which the child seat is placed on a horizontal flat surface.

If the back section and seat section can be adjusted relative to each other (or if an inclination of the back section can be adjusted relative to the seat section), the respective conditions should preferably apply to at least one inclination position, further preferably to at least a partial range of an inclination adjustment range which in total accounts for at least half of a maximum possible change in inclination, if necessary for all inclination settings.

If the main body is adjustable in itself, for example in the case of child seats which have a base relative to which a seat element can be adjusted (or an inclination of the main body can be adjusted), the respective conditions should preferably apply to at least one inclination position, further preferably to at least a partial range of an inclination adjustment range which in total accounts for at least half of a maximum possible change in inclination, if necessary for all inclination settings.

If the impact shield is adjustable relative to the main body (rotationally and/or translationally), the respective conditions should preferably apply to at least one setting, further preferably to at least half of all or all 9) rotational adjustment options and/or to at least half of all or all translational adjustment options.

Preferably, the active protection means (in particular the airbag) is configured to catch the upper body and/or head of the child in the event of an activation. Alternatively or additionally, the active protection means may be configured to act in the direction of the child’s thighs and/or pelvis in the event of an activation.

Preferably, in the activated and/or non-activated state, the active protection means (the airbag) extends at least partially over an upper side of the impact shield and/or an inner side of the impact shield and/or an underside of the impact shield.

In embodiments, the child seat is configured such that a rotation of the impact shield with respect to the main body is blocked, at least when (possibly exclusively when) the active protective means is in an activated state. For example, the impact shield can already be rigidly connected or connectable to the main body (possibly detachable from it or translationally movable relative to it). Alternatively, a rotation of the impact shield relative to the main body may be possible in principle (for example, a rotation axis may be formed). However, this rotation should preferably be blocked or at least blockable (possibly both in the activated state as well as in the non-activated state, but in particular at least in the activated state). For example, the impact shield can be brought in a positive fit with the main body or brought into abutment with the main body (in particular a support section thereof) in such a way that the main body prevents a rotation of the impact shield (in the event of a sudden deceleration). This is particularly preferred in order to (linearly) transmit forces that are introduced by the child’s head, for example in the direction of the support foot.

In general, the child seat is at least configured or configurable in such a way that no (substantial or, for example, only unavoidable due to material deformation) rotations of individual elements of the child seat against each other can take place between the impact shield and the support foot (in the event of a sudden deceleration).

As particularly preferred, the active protection means comprises an (inflatable) gas bag, preferably an airbag. Alternatively or additionally, an active protection means can also be defined by an impact shield bracing device. An activation is preferably triggered by an accident or a sudden deceleration. Furthermore, the active protective means should provide a (significant) protective effect for the child.

Rotation of the head relative to the upper body (or torso) of the child is, in particular, understood to be a rotation of the respective centres of gravity of the child's body parts. For this, one can act on the assumption of a dummy (in particular a dummy described above). Under a rotation of the child's upper body relative to the buttocks is preferably a rotation of the respective centre of gravity to be taken into account.

The child's upper body is preferably understood to be the child's torso, as well its arms and its head.

A rotation (of the upper body) is understood to mean, in particular, a rotation of a centre of gravity of the child's upper body relative to an axis that passes through the centres of gravity of the child's thighs and/or relative to an axis that lies between back section and seat section.

A displacement in the direction of travel is understood to mean in particular that the child (as a whole) moves forward (that is at least the centres of gravity of the torso, the head as well as the thighs all move forward). Preferably, the child seat is configured or can be configured such that such a forward movement (as arithmetic mean of the forward movements of the centres of gravity of the head, the torso and one of the thighs) is reduced by at least 2 cm, preferably at least 5 cm, by the impact shield in the activated state of the active protective means. A maximum displacement in the direction of travel in the activated state of the active protective means should be at most 10 cm, preferably at most 5 cm (relative to the impact shield).

A possible (maximum) rotation of the child's head relative to the torso should be by an angle of at least 5°, preferably 10°, possibly at least 20° or at least 30° less than a (maximum) rotation possibility of the child's head relative to the child's torso in the non-activated state of the protective means. A maximum possible angle of rotation is preferably (in the activated state of the active protective means) at most 90°, preferably at most 60°, even more preferably at most 35°.

The same should preferably apply to a rotation of the upper body relative to a child's buttocks.

Under a moment of catching is preferably to be understood a moment of a first contact between the respective body part of the child (e.g., head) and the impact shield.

A (possible) rotation of the impact shield is preferably less in the activated state of the active protective means than in the non-activated state. The corresponding angle can be at least 10°, possibly at least 20° or at least 30° less in the activated state, for example. In the activated state of the airbag, a maximum possible angle of rotation can, for example, be at most 45°, preferably at most 25°, even more preferably at most 10° or at most 5°.

Preferably, the impact shield is positioned in such a way that, in the event of a sudden deceleration of the motor vehicle, a force transmitted to the child's head is introduced into the impact shield at least predominantly linearly.

A linear introduction of a respective force into the impact shield should be understood in particular to mean that the force acting at the respective location due to the impact of the child's head on the surface of the active protective means (airbag) has a direction (which can correspond to the direction of movement of the respective point of the child's head surface that comes into contact with the surface of the airbag), with the impact shield (or a section thereof) lying in this direction (without taking into account the active protective means or gas bag). The entire contact area (between the head or face of the child and the surface of the active protective means or airbag) can be divided in particular into cells, each of which has a square with an edge length of 1 cm. A predominantly linear introduction of the forces into the impact shield should be understood in particular to mean that for at least 50% of these cells applies, that a force acts in the direction of the impact shield in the corresponding sub-area of the contact area. This applies in particular in the activated state of the active protective means.

Furthermore, the impact shield can be positioned in such a way that, in the event of a sudden deceleration of the motor vehicle, forces transmitted by the child's head are at least predominantly transmitted linearly into a support foot (in particular in the activated state of the active protective means).

With regard to the introduction, the analogous applies with respect to the support foot. Preferably, with respect to the support foot, a linear introduction into the same should also be assumed if the respective force vector is directed in a direction which intersects a spatial region (which is formed by an infinitely long straight cylinder, the shell of which forms by the contour line of the support foot in a section along a central vertical-to-front plane, wherein a vertical-to-front plane should be a plane which is both vertically orientated as well as aligned parallel to the forward direction). A central such plane is to be understood in particular to be a symmetry plane of the child seat or a centre plane.

In embodiments, a section of the impact shield is located in an imaginary line through the centre of gravity of the child's head in the direction of movement of the child's head at the moment of catching (initial contact with the protective means). Alternatively or additionally, a section of the impact shield is located in an extension of an imaginary line between the centre of gravity of the child's head and an (earliest) point of contact of the child's head at the active protective means at the moment of (the) catching. An (earliest) point of contact of the child's head is to be understood in particular as the point that comes into contact with the surface of the active protective means first. The conditions in this paragraph apply in particular to (possibly only to) an activated state of the active protective means. The imaginary line is preferably no further than 10 cm, more preferably no further than 5 cm from a centre of gravity of the impact shield.

In embodiments, the child seat may comprise a support foot. Preferably, a section of the support foot is located in an extension of an (the) imaginary line through the centre of gravity of the child's head in the direction of movement of the child's head at the moment of a (the) catching. Alternatively or additionally, a section of the support foot is preferably located in an extension of an imaginary line between the centre of gravity of the child's head and an (earliest) contact point of the child on the active protective means at the moment of a (the) catching. The conditions mentioned here preferably apply at least (in particular only) to an activated state of the active protective means. The imaginary line preferably intersects an upper half, preferably an upper third of the support foot (in at least one, preferably a middle, use configuration thereof, possibly in all use configurations thereof or at least half of all use configurations).

In embodiments, the active protective means extends in the non-activated state at least as far forward as in the activated state, or even further forward than in the activated state. Alternatively or additionally, the active protective means in the non-activated state can cover at least as large a part of the upper side of the impact shield as in the activated state, or cover a larger part of the upper side of the impact shield than in the activated state. The respective extension of the cover is preferably to be understood as already defined above. Preferably, the active protective means in the non-activated state extends at least 3 cm, more preferably at least 5 cm, possibly at least 8 cm further forward than in the activated state (in at least one state of use of the child seat or impact shield), whereby a forward direction (in a horizontal plane) is to be assumed here in particular. In the non-activated state, the active protective means preferably covers at least 10%, possibly at least 30% of an additional surface (compared to the covered surface in the activated state and relative to the covered surface in the activated state).

The above-mentioned object is also preferably solved by a system comprising a child seat of the above type as well as the motor vehicle. The above-mentioned object is further solved by a method for holding a child seat in a motor vehicle in the event of a sudden deceleration of the motor vehicle, wherein the above child seat and/or the above system is provided. Functional features explained in the above context can take place in the method, in particular as method instances.

Further features result from the dependent claims.

Figure 2:
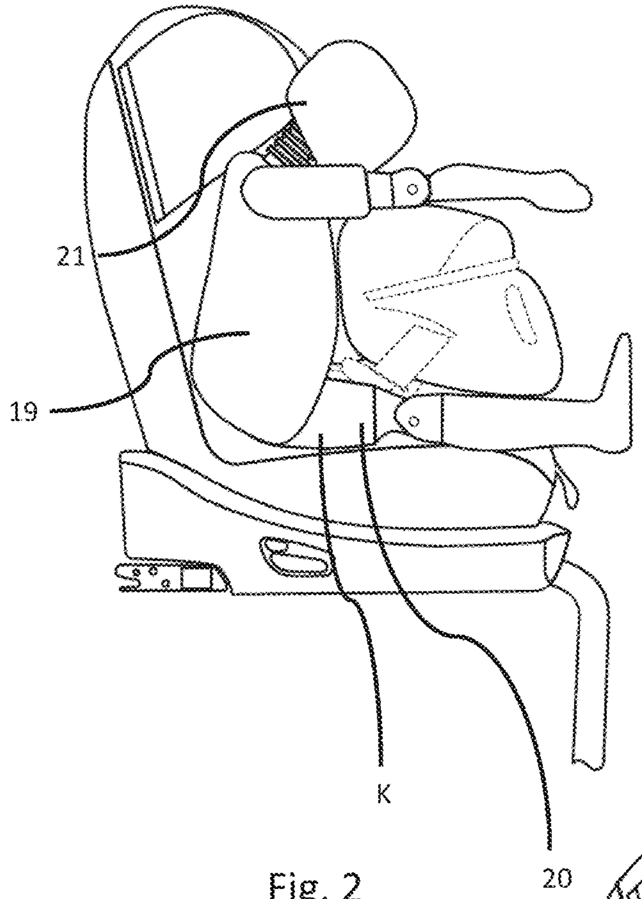
Figure 3:
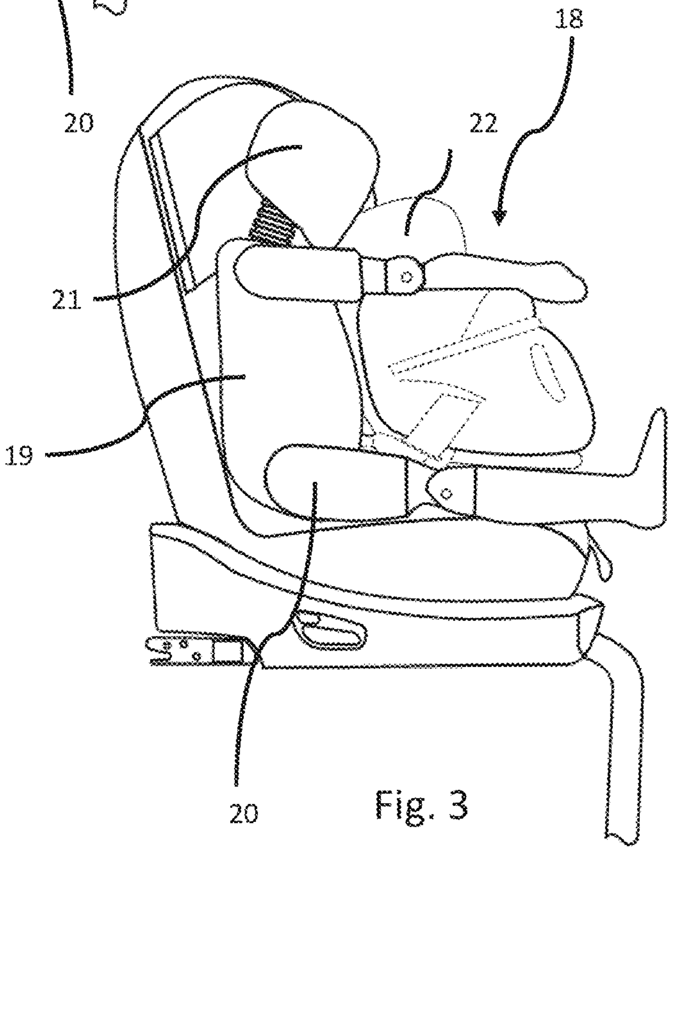
Figure 4:
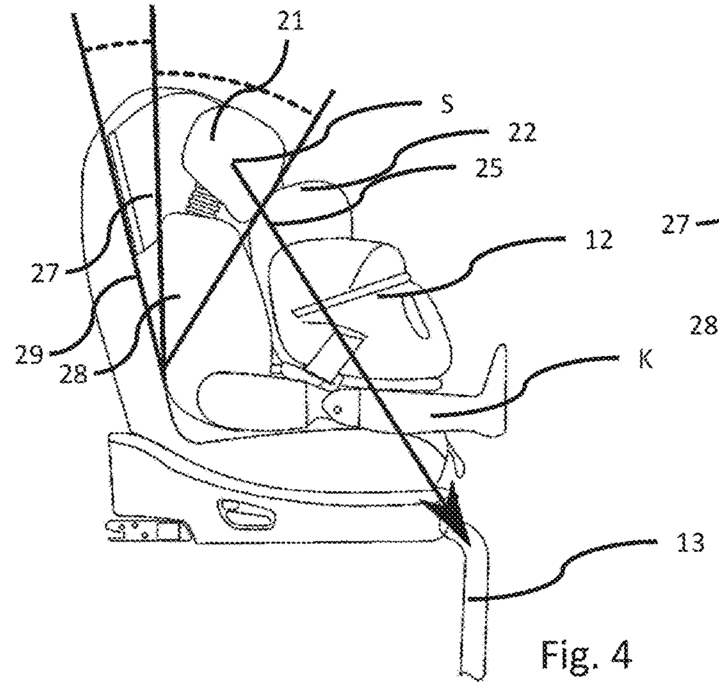
Figure 5:
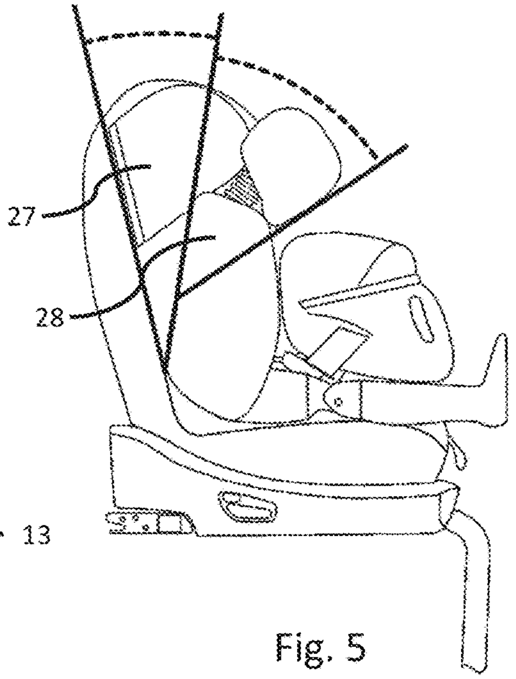

In the following, the invention is described with reference to execution examples, which are explained in more detail with reference to the figures. Hereby show:

FIG. 1 a schematic side view of a child seat according to the invention,

FIG. 2 the child seat according to FIG. 1 during a sudden deceleration without activation of an active protective means;

FIG. 3*a* situation analogous to FIG. 2 with activated protective means;

FIG. 4 an illustration of various angles and movements for the child seat as shown in FIGS. 1 to 3 with activated protective means;

FIG. 5 an illustration analogous to FIG. 4 with non-activated protective means; and FIG. 6*a* comparison of the situation analogous to FIG. 4, once for a comparatively small dummy and once for a comparatively large dummy.

In the following description, the same reference numbers are used for same and same acting parts.

FIG. 1 shows a child seat with a main body 11 as well as an impact shield 12. A child (or dummy) K is accommodated in the child seat. FIG. 1 shows the child seat or, in particular, the child in a state when the motor vehicle (in which the child seat is arranged) is stationary or in a normal driving situation (without sudden accelerations and/or decelerations). The impact shield 12 has an upper side 13, an outer side 14, a underside 15 and an inner side 16.

Furthermore, the child seat comprises a support foot 17 (preferably arranged here on or as part of) an (optional) base 18 (which can also be designed without a support foot).

FIG. 2 shows the child K in the event of a sudden deceleration of the child seat (for example in the event of a frontal accident). In this state, a torso 19 of the child is rotated relative to the thighs 20 (still at the front). Similarly, a head 21 of the child is rotated forward relative to the torso 19 (and also the thighs 20).

FIG. 3 shows the active protective means 22 (not recognisable in FIGS. 1 and 2) (here in the form of an airbag) in the activated state. It can be seen that a rotation of the child in the event of a sudden deceleration (corresponding to that in FIG. 2) rotates less far (relative to the torso 19). The same applies to the entire upper body or the torso 19 relative to the thighs 20. In FIG. 3 it can also be seen that the active protective means or the airbag 22 only covers a section of the upper side 13 (in the activated state) or (at least approximately) at least a front quarter of the upper side remains free.

The increased respective rotation angles in the case of a non-activated protective means (see FIG. 5) are shown again in FIG. 4 (for the activated state) and FIG. 5 (for the non-activated state). Furthermore, an arrow 25 is shown in FIG. 4, which corresponds to a direction of movement of a centre of gravity S of the head 21 of the child K at the moment of (earliest) contact with a surface of the protective means 22. This direction (or this arrow) passes through both the impact shield 12 as well as the support foot 17 (that is preferably an upper half or an upper third of the support foot 17.

Figure 6:
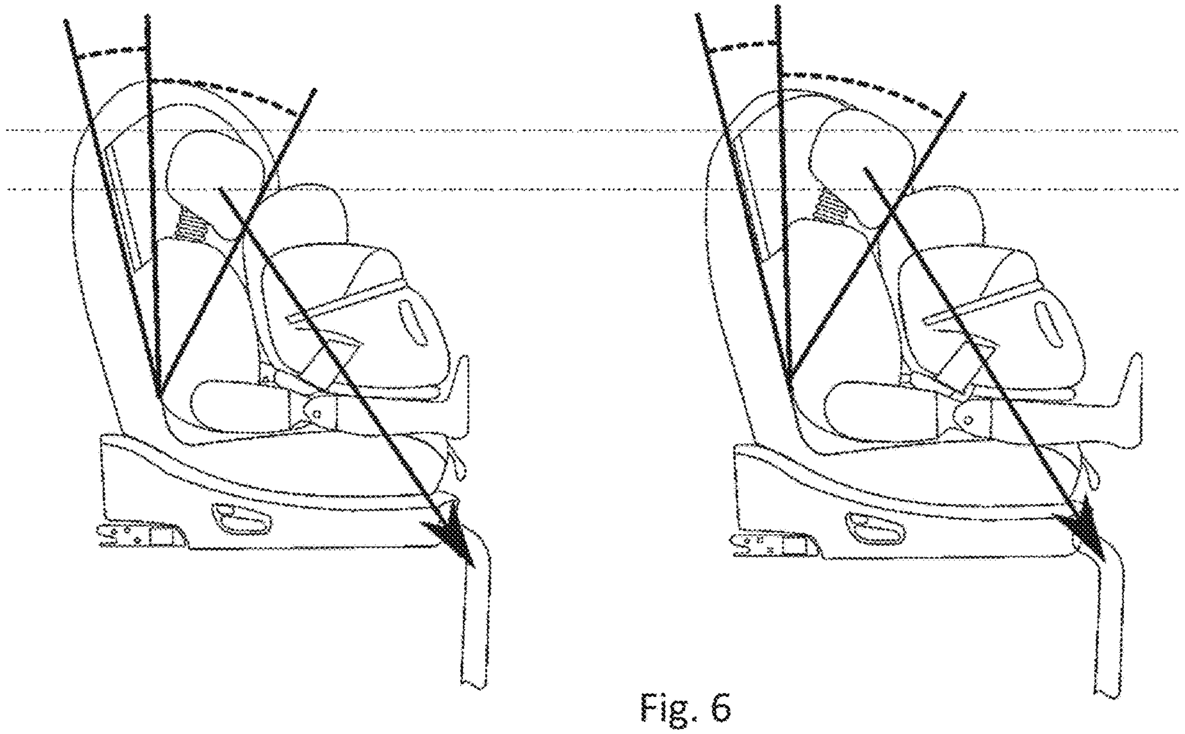

As additionally shown in FIG. 6, this preferably applies to a comparatively small dummy (see FIG. 6, left side) as well as to a comparatively large dummy (see FIG. 6, right half).

The rotation of the child (see FIGS. 4 to 6) can also be described by a first angle 27 and a second angle 28. The first angle 27 is preferably the angle that a back of the child swivels forward relative to a back rest surface 29 (for resting the child's back) in the event of sudden deceleration. The angle 28 indicates the angle by which a foremost point of the child's head is located relative to the child's back in the respective situation. Both the first angle 27 as well as the second angle 28 are (considerably) larger in FIG. 5 than in FIG. 4 (in which the active protective means is activated).

At this point, it should be pointed out that all the parts described above are claimed to be essential to the invention when viewed on their own and in any combination, in particular the details shown in the drawings. Modifications thereof are familiar to the skilled person.

Furthermore, it is pointed out that a scope of protection as broad as possible is sought. In this respect, the invention defined in the claims can also be specified by features that are described with further features (even without that these further features should necessarily be included). It is explicitly pointed out that round brackets and the term "in particular" are intended to emphasise the optional nature of features in the respective context (which does not mean, conversely, that a feature is to be regarded as mandatory in the corresponding context without such identification).

REFERENCE SIGNS

K child
S centre of gravity of the child's head
10 child seat
11 main body
12 impact shield
13 top side
14 outer side
15 underside
16 inner side
17 support foot
18 base
19 torso
20 thigh
21 head
22 protective means
25 arrow
27 first angle
28 second angle
29 back rest surface

The invention claimed is:

1. A child seat for mounting on a motor vehicle seat, wherein the child seat has a main body configured for accommodating a representation of a child that is one of a Q1.5 dummy, a Q3 dummy, a Q3S dummy and a Q6 dummy and an impact shield configured for holding the representation of the child, wherein at least one active protective means is arranged on or formed by the impact shield, wherein the active protective means is transferable from a non-activated state to an activated state, and wherein:

in the non-activated state, the active protection means is configured to allow either a displacement of the child in a direction of travel or allow a rotation of an upper body of the representation of the child relative to a buttocks of the representation of the child, and in the activated state the active protection means is configured to block rotation of the impact shield relative to the main body, and in the activated state the active protection means is configured to entirely halt the rotation of the upper body of the representation of the child relative to the buttocks, limit an amount of the rotation, limit the displacement of the representation of the child in the direction of travel, or entirely limit the displacement of the representation of the child in the direction of travel, wherein the child seat comprises a support foot, wherein a section of the support foot is configured to be located in an extension of an imaginary line through a center of gravity of a head of the representation of the child in a direction of movement of the head at a moment of a catching of the head by the active protection means or is located in an extension of an imaginary line between the center of gravity of the head and a contact point of the representation of the child on the active protective means at the moment of the catching.

2. The child seat according to claim 1, wherein: in the non-activated state, a rotation of the head relative to a torso of the representation of the child is enabled and in the activated state is not enabled or only enabled to a limited extent.

3. A method for holding the representation of the child in a motor vehicle in an event of a sudden deceleration of the motor vehicle, wherein the child seat according to claim 1 is provided to hold the child.

4. The child seat according to claim 1, wherein the active protection means comprises an airbag, or the child seat is arranged in a motor vehicle in a forward-facing installation.

5. The child seat according to claim 1, wherein the active protection means is configured to catch the upper body or head of the representation of the child when activated.

6. The child seat according to claim 1, wherein the active protection means is configured to deploy in the direction of thighs or a pelvis of the representation of the child when activated.

7. A system comprising the child seat according to claim 1 and a motor vehicle.

8. The child seat according to claim 1, wherein the impact shield is positioned such that, in an event of a sudden deceleration, forces transmitted by the head are transmitted at least predominantly linearly into the impact shield.

9. The child seat according to claim 1, wherein the impact shield is positioned such that, in an event of a sudden deceleration, forces transmitted by the head are transmitted at least predominantly linearly into the support foot.

10. The child seat according to claim 1 wherein the impact shield has the active protective means on its upper side, wherein the active protective means in the activated state extends only partially over an upper side of the impact shield, and does not extend over a front section of the upper side of the impact shield.

11. The child seat according to claim 10, wherein the active protective means in the non-activated state extends at least as far forward as in the activated state, or extends further forward than in the activated state; or that the active protective means in the non-activated state covers at least as large a part of the upper side of the impact shield as in the activated state, or covers a larger part of the upper side of the impact shield than in the activated state.

12. A child seat for mounting on a motor vehicle seat, wherein the child seat has a main body configured for accommodating a representation of a child that is one of a Q1.5 dummy, a Q3 dummy, a Q3S dummy and a Q6 dummy and an impact shield configured for holding the representation of the child, wherein at least one active protective means is arranged on or formed by the impact shield, wherein the active protective means is transferable from a non-activated state to an activated state, and wherein:

in the non-activated state, the active protection means is configured to allow either a displacement of the child in a direction of travel or allow a rotation of a head of the representation of the child relative to a torso of the representation of the child, and in the activated state the active protection means is configured to block rotation of the impact shield relative to the main body, and in the activated state the active protection means is configured to entirely halt the rotation of the head of the representation of the child relative to the torso, limit an amount of the rotation, limit the displacement of the representation of the child in the direction of travel, or entirely limit the displacement of the representation of the child in the direction of travel, wherein the child seat comprises a support foot, wherein a section of the support foot is configured to be located in an extension of an imaginary line through a center of gravity of the head of the representation of the child in a direction of movement of the head at a moment of a catching of the head by the active protection means.

13. A child seat for mounting on a motor vehicle seat, wherein the child seat has a main body configured for accommodating a representation of a child that is one of a Q1.5 dummy, a Q3 dummy, a Q3S dummy and a Q6 dummy and an impact shield configured for holding the representation of the child, wherein at least one active protective means is arranged on or formed by the impact shield, wherein the active protective means is transferable from a non-activated state to an activated state, and wherein:

in the non-activated state, the active protection means is configured to allow either a displacement of the child in a direction of travel or allow a rotation of an upper body of the representation of the child relative to a buttocks of the representation of the child, and in the activated state the active protection means is configured to entirely halt the rotation of the upper body of the representation of the child relative to the buttocks and entirely limit the displacement of the representation of the child in the direction of travel, wherein the child seat comprises a support foot, wherein both when the representation of the child is the Q1.5 dummy and when the representation of the child is the Q6 dummy a section of the support foot is configured to be located in an extension of an imaginary line through a center of gravity of a head of the representation of the child in a direction of movement of the head at a moment of a catching of the head by the active protection means or is located in an extension of an imaginary line between the center of gravity of the head and a contact point of the representation of the child on the active protective means at the moment of the catching.

* * * * *